United States Patent
Kim

(10) Patent No.: US 11,420,681 B2
(45) Date of Patent: Aug. 23, 2022

(54) SIDE SILL STRUCTURE FOR VEHICLE

(71) Applicants: HYUNDAI MOTOR COMPANY, Seoul (KR); KIA MOTORS CORPORATION, Seoul (KR)

(72) Inventor: Hyun Sik Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/008,046

(22) Filed: Aug. 31, 2020

(65) Prior Publication Data
US 2021/0179197 A1   Jun. 17, 2021

(30) Foreign Application Priority Data
Dec. 16, 2019 (KR) .................. 10-2019-0168224

(51) Int. Cl.
*B62D 25/02* (2006.01)
*B62D 27/02* (2006.01)
*B62D 27/06* (2006.01)

(52) U.S. Cl.
CPC ......... *B62D 25/025* (2013.01); *B62D 27/023* (2013.01); *B62D 27/065* (2013.01)

(58) Field of Classification Search
CPC ...... B62D 25/025; B62D 27/023; B60K 1/04; B60K 2001/0405; B60K 2001/0438; B60K 2001/0455; B60K 2001/0472
USPC ............................................ 296/209, 187.12
See application file for complete search history.

(56) References Cited

U.S. PATENT DOCUMENTS 9,957,990 B2 *  5/2018  Jung ................... F16B 37/067
2018/0134320 A1  5/2018  Jeong

FOREIGN PATENT DOCUMENTS

JP      2017-226353 A    12/2017
KR   10-2018-0077990 A    7/2018

OTHER PUBLICATIONS

European Search Report, dated Feb. 26, 2021 in corresponding Application EP 20 19 4039, 7 pages.

* cited by examiner

*Primary Examiner* — Dennis H Pedder
(74) *Attorney, Agent, or Firm* — Lempia Summerfield Katz LLC

(57) ABSTRACT

A side sill structure for a vehicle includes: a side sill having a cavity; a side sill reinforcement which is received in the cavity of the side sill; and a battery mounting pipe which is joined to the side sill reinforcement, wherein the side sill reinforcement is joined to the side sill as a mounting bolt is fastened to the battery mounting pipe.

11 Claims, 11 Drawing Sheets

SIDE SILL STRUCTURE FOR VEHICLE

CROSS-REFERENCE TO RELATED APPLICATION

This application claims priority to and the benefit of Korean Patent Application No. 10-2019-0168224, filed on Dec. 16, 2019, the entire contents of which are incorporated herein by reference.

FIELD

The present disclosure relates to a side sill structure for a vehicle, and more particularly, to a side sill structure for a vehicle allowing a side sill reinforcement to be firmly mounted in a side sill.

BACKGROUND

The statements in this section merely provide background information related to the present disclosure and may not constitute prior art.

A vehicle includes a pair of side sills disposed on left and right sides of a floor. A front end of each side sill may be connected to a rear end of a front side member, and a rear end of each side sill may be connected to a front end of a rear side member. The side sills may protect a passenger compartment from side collisions, front collisions, etc. of the vehicle.

Each side sill may have a cavity which is open to the exterior of the vehicle. A side sill reinforcement may be mounted in the cavity of the side sill by using a plurality of brackets and welding in order to deal with the collisions. The side sill reinforcement may be an extruded product which is produced by extruding a material containing aluminum. The side sill reinforcement may extend in a longitudinal direction of the side sill.

An electric vehicle is equipped with a battery assembly which is mounted under a floor of a vehicle body. Both side edges of the battery assembly may be mounted on the side sill reinforcements through a plurality of bolts.

The side sill may be made of a steel material by taking stiffness and strength into consideration, and the side sill reinforcement may be made of an aluminum material by taking an extrusion method into consideration. The steel and aluminum materials may not be directly joined by welding because of the material properties thereof. When the side sill reinforcement is mounted in the cavity of the side sill, dissimilar materials joining such as flow drill screwing (FDS) and self-piercing riveting (SPR) or mechanical joining using bolts and nuts may be applied. However, dissimilar materials joining has disadvantages in terms of investment cost because of expensive equipment, and mechanical joining requires a relatively large amount of man hours.

According to the related art, after a plurality of brackets made of a steel material are joined to the side sill reinforcement by FDS, the plurality of brackets are joined to the side sill by spot welding so that the side sill reinforcement may be mounted in the side sill.

According to the related art, when the side sill reinforcement is mounted in the cavity of the side sill, the plurality of brackets and welding spots are relatively increased, which increases weight and manufacturing cost.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a side sill structure for a vehicle allowing a side sill reinforcement to be firmly mounted in a side sill without using brackets and welding, by joining a battery mounting pipe to the side sill reinforcement by riveting and fastening a mounting bolt to the battery mounting pipe.

According to an aspect of the present disclosure, a side sill structure for a vehicle may include: a side sill having a cavity; a side sill reinforcement which is received in the cavity of the side sill; and a battery mounting pipe which is joined to the side sill reinforcement. The side sill reinforcement may be joined to the side sill as a mounting bolt is fastened to the battery mounting pipe.

The side sill reinforcement may have a first mounting hole through which the battery mounting pipe passes, and the battery mounting pipe may be joined to the first mounting hole of the side sill reinforcement.

The battery mounting pipe may include a cylindrical portion and a head portion provided on a bottom end of the cylindrical portion, the cylindrical portion may include a deformable portion and an upper portion located above the deformable portion, the deformable portion may be located between the upper portion and the head portion, and the upper portion may have an internal thread.

The head portion may have an outer diameter greater than a diameter of the first mounting hole, the head portion may support the side sill reinforcement, and a thickness of the head portion may be determined so that the side sill reinforcement may be arranged in the cavity of the side sill.

As the deformable portion is expanded or bulged outwards by an axial load which is applied in an axial direction of the battery mounting pipe, the deformable portion may be deformed into a bulged portion.

The first mounting hole may be provided in a bottom wall of the side sill reinforcement, the bulged portion may press the bottom wall of the side sill reinforcement downwardly, and the head portion may press the bottom wall of the side sill reinforcement upwardly.

The side sill may have a second mounting hole which is aligned with the first mounting hole and the battery mounting pipe, the mounting bolt may pass through the first mounting hole and a hollow portion of the battery mounting pipe, and an external thread of the mounting bolt may engage with the internal thread of the upper portion.

The side sill reinforcement may have a plurality of first mounting holes through which the battery mounting pipe passes, the side sill may have a plurality of second mounting holes through which the battery mounting pipe passes, and the plurality of second mounting holes may be aligned with the plurality of first mounting holes.

The battery mounting pipe may include a cylindrical portion and a head portion provided on a top end of the cylindrical portion, and the cylindrical portion may include a deformable portion, an upper portion located above the deformable portion, and a lower portion located below the deformable portion.

As the deformable portion is expanded or bulged outwards by an axial load which is applied in an axial direction of the battery mounting pipe, the deformable portion may be deformed into a bulged portion.

The side sill reinforcement may have a support rib supporting the bulged portion, the bulged portion may press the support rib upwardly, and the head portion may press the top wall of the side sill downwardly.

A thickness of the deformable portion may be less than a thickness of the upper portion and a thickness of the lower portion.

The upper portion may have an upper internal thread on an inner surface thereof, and the lower portion may have a lower internal thread on an inner surface thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
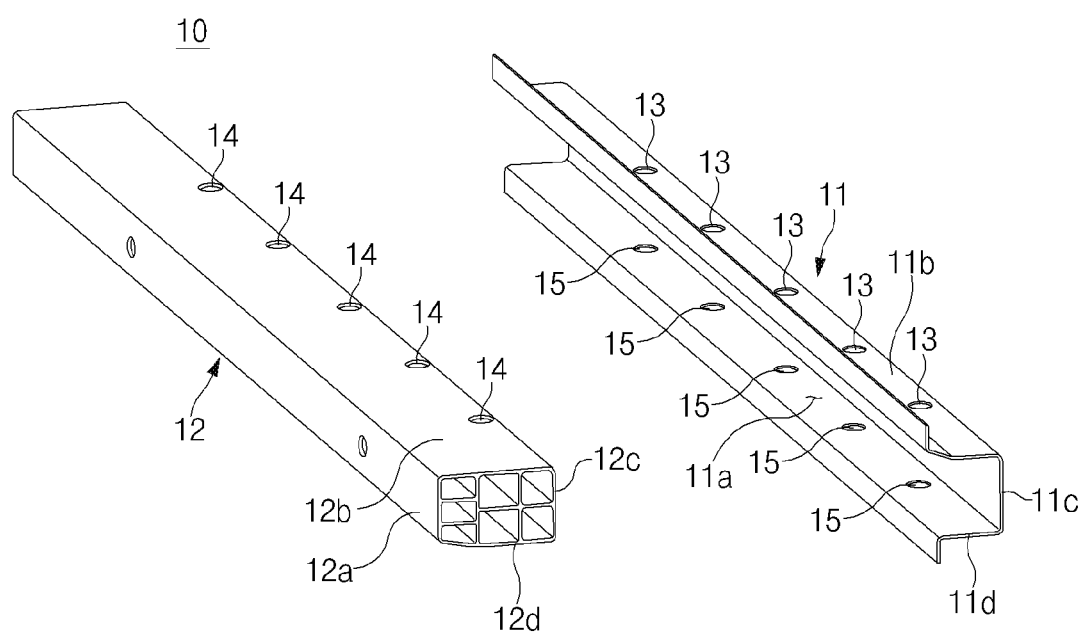
FIG. 1 illustrates a side sill and a side sill reinforcement in a side sill structure for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
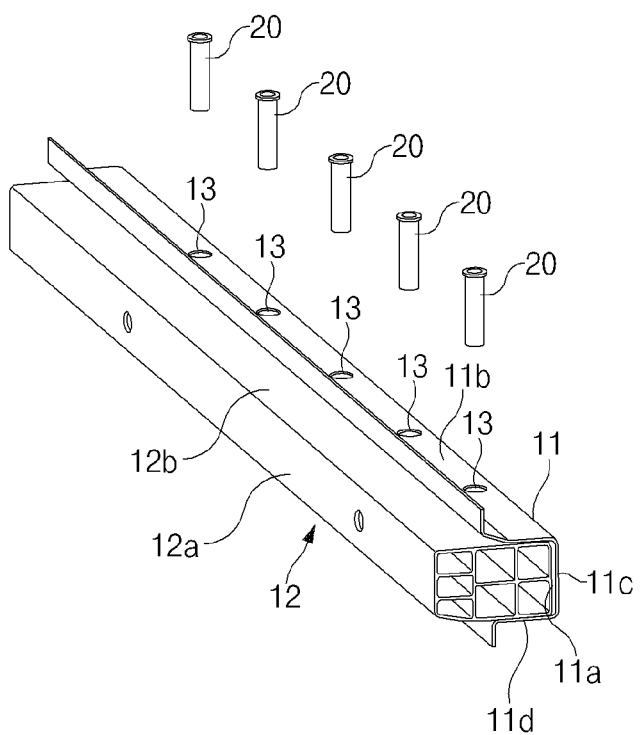
FIG. 2 illustrates a side sill, a side sill reinforcement, and a battery mounting pipe in a side sill structure for a vehicle according to an exemplary form of the present disclosure.

Referring to FIGS. 1 and 2, a side sill structure 10 for a vehicle according to an exemplary form of the present disclosure may include a side sill 11, a side sill reinforcement 12 received in the side sill 11, and a battery mounting pipe 20 joining the side sill 11 and the side sill reinforcement 12.

The side sill 11 may include a cavity 11a open to the exterior of the vehicle, a top wall 11b facing the top of the vehicle, an inboard side wall 11c facing the interior of the vehicle, and a bottom wall 11d facing the ground. The cavity 11a may be defined by the top wall 11b, the inboard side wall 11c, and the bottom wall 11d. For example, the side sill 11 may be a metal material having high strength, such as steel.

Figure 4:
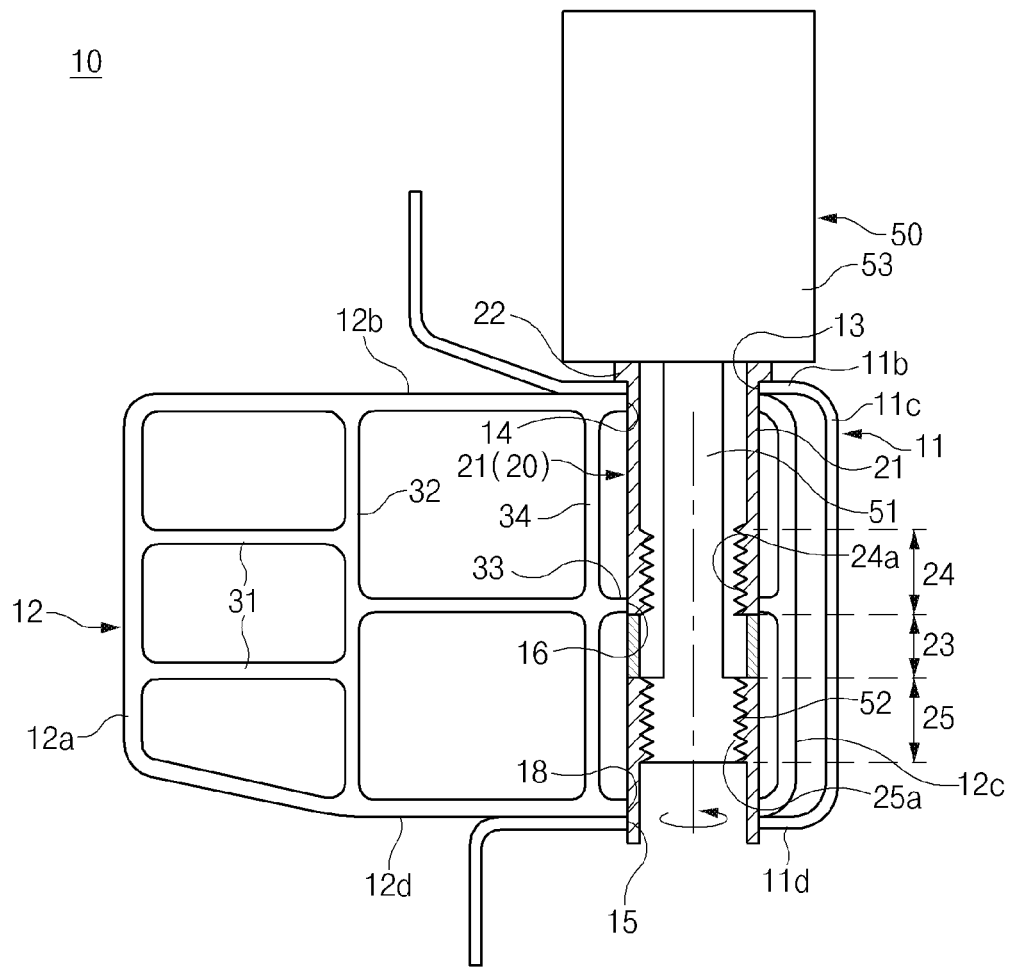
FIG. 4 illustrates a state in which a drifter and an anvil of a nut riveter are set up in a battery mounting pipe in a side sill structure for a vehicle according to an exemplary form of the present disclosure.

The side sill reinforcement 12 may be an extruded product which is produced by an extrusion method and extended in a longitudinal direction of the vehicle. Referring to FIG. 4, the side sill reinforcement 12 may include an outboard side wall 12a facing the exterior of the vehicle, a top wall 12b facing the top of the vehicle, an inboard side wall 12c facing the interior of the vehicle, and a bottom wall 12d facing the ground. For example, the side sill reinforcement 12 may be a material having excellent toughness and stiffness, such as aluminum and an aluminum alloy.

When the side sill reinforcement 12 is received in the cavity 11a of the side sill 11, the top wall 12b of the side sill reinforcement 12 may contact the top wall 11b of the side sill 11, the inboard side wall 12c of the side sill reinforcement 12 may face the inboard side wall 11c of the side sill 11, and the bottom wall 12d of the side sill reinforcement 12 may contact the bottom wall 11d of the side sill 11. The side sill reinforcement 12 may extend in a longitudinal direction of the side sill 11. The side sill reinforcement 12 may have a plurality of ribs 31, 32, 33, and 34 formed therein, and the plurality of ribs 31, 32, 33, and 34 may extend in a longitudinal direction of the side sill reinforcement 12. The stiffness of the side sill reinforcement 12 may be improved by the plurality of ribs 31, 32, 33, and 34, and thus an impact load during a side impact of the vehicle may be uniformly distributed through the plurality of ribs 31, 32, 33, and 34.

The side sill reinforcement 12 may have horizontal ribs 31 and a first vertical rib 32 which are adjacent to the outboard side wall 12a, and the horizontal ribs 31 may extend horizontally from the outboard side wall 12a. The first vertical rib 32 may extend vertically to connect the top wall 12b and the bottom wall 12d, and the first vertical rib 32 may be directly connected to the horizontal ribs 31.

The side sill reinforcement 12 may have a support rib 33 and a second vertical rib 34 which are adjacent to the inboard side wall 12c. The second vertical rib 34 may extend vertically to connect the top wall 12b and the bottom wall 12d, and the second vertical rib 34 may be spaced apart from the first vertical rib 32. The second vertical rib 34 may be directly connected to the support rib 33, and the support rib 33 may extend horizontally to connect the first vertical rib 32 and the inboard side wall 12c.

The side sill reinforcement 12 may have a plurality of first mounting holes 14, 16, and 18 through which the battery mounting pipe 20 passes. The battery mounting pipe 20 may penetrate the side sill reinforcement 12 through the plurality of first mounting holes 14, 16, and 18. Specifically, the side sill reinforcement 12 may have top mounting holes 14 formed in the top wall 12b, bottom mounting holes 18 formed in the bottom wall 12d, and middle mounting holes 16 formed in at least one of the plurality of ribs 31, 32, 33, and 34. A diameter of the top mounting hole 14, a diameter of the bottom mounting hole 18, and a diameter of the middle mounting hole 16 may be the same as or similar to each other, and the top mounting hole 14, the bottom mounting hole 18, and the middle mounting hole 16 may be aligned. In particular, the middle mounting hole 16 may be punched or drilled in the support rib 33 connected to the inboard side wall 12c.

The side sill 11 may have a plurality of second mounting holes 13 and 15 through which the battery mounting pipe 20 passes, and the plurality of second mounting holes 13 and 15 may be aligned with the plurality of first mounting holes 14, 16, and 18. The battery mounting pipe 20 may penetrate the plurality of second mounting holes 13 and 15 in a height direction of the side sill 11. Specifically, the side sill 11 may have a plurality of top mounting holes 13 formed in the top wall 11b and a plurality of bottom mounting holes 15 formed in the bottom wall 11d, and the top and bottom mounting holes 13 and 15 may be punched or drilled in the side sill 11. A diameter of the top mounting hole 13 may be the same as or similar to a diameter of the bottom mounting hole 15, and the top mounting holes 13 may be aligned with the bottom mounting holes 15.

Figure 3:
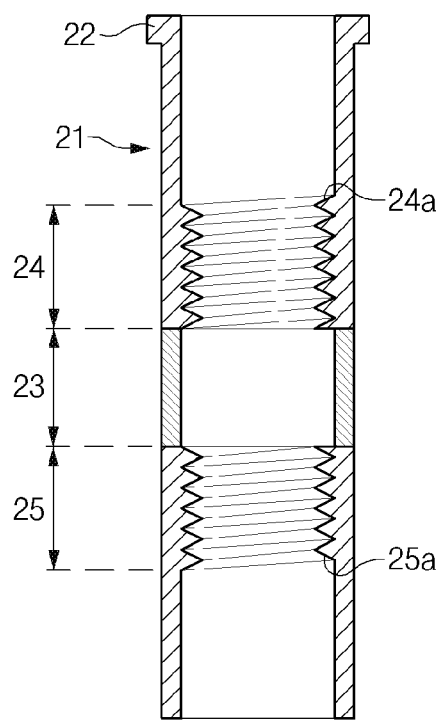
FIG. 3 illustrates a cross-sectional view of a battery mounting pipe in a side sill structure for a vehicle according to an exemplary form of the present disclosure.

The battery mounting pipe 20 may be a hollow pipe in which a drifter 51 of a nut riveter 50, a mounting bolt 63, and the like are received. Referring to FIG. 3, the battery mounting pipe 20 may include a cylindrical portion 21 and a head portion 22 provided on a top end of the cylindrical portion 21.

Figure 5:
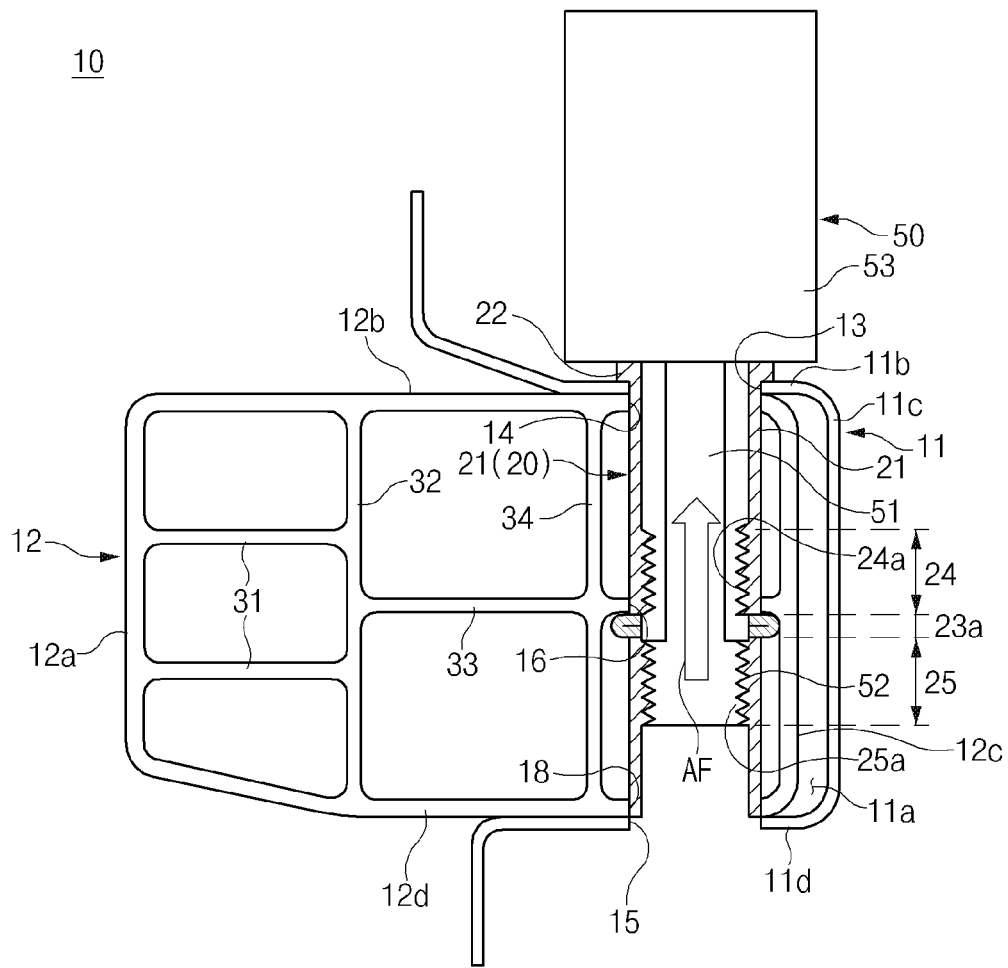
FIG. 5 illustrates a state in which a deformable portion of the battery mounting pipe is deformed as the drifter of the nut riveter operates.
Figure 6:
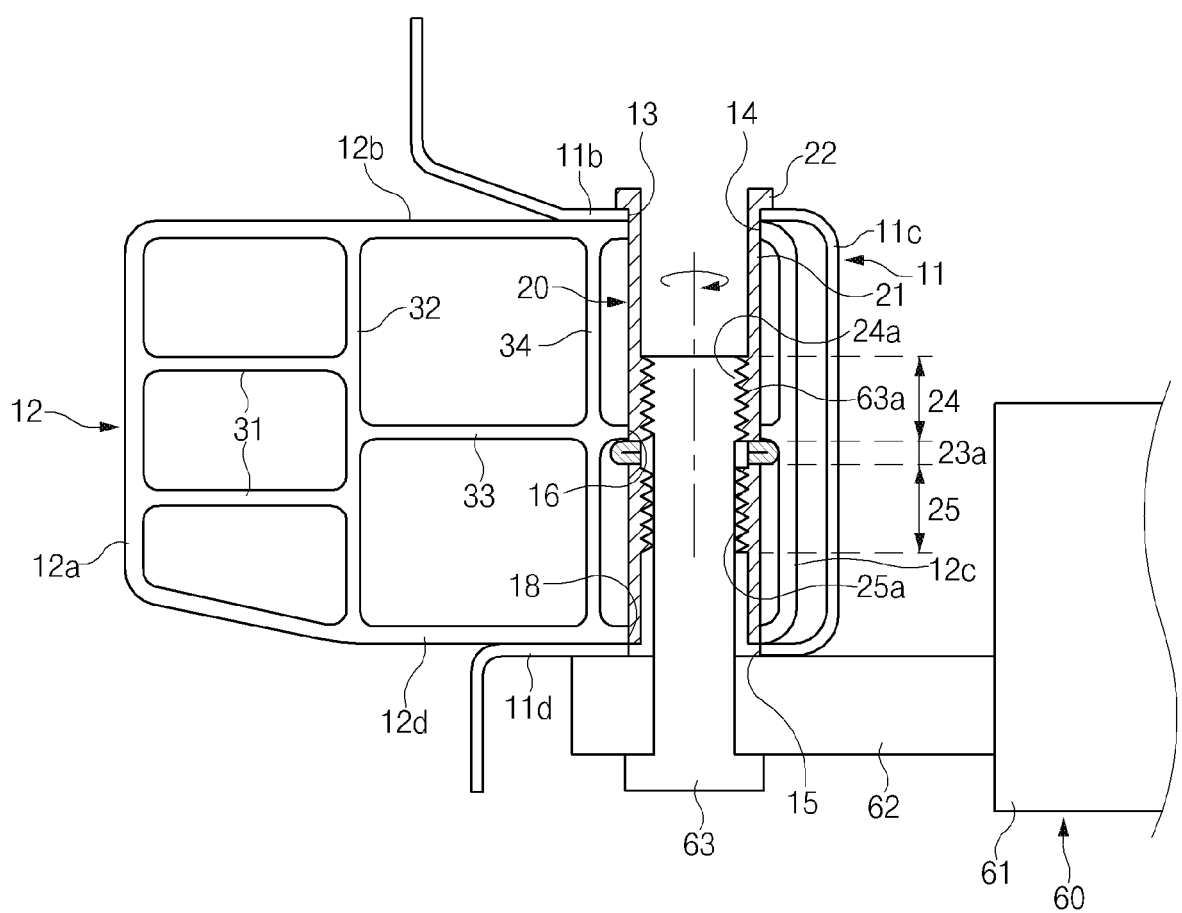
FIG. 6 illustrates a cross-sectional view of a structure in which a battery assembly is mounted in a side sill structure for a vehicle according to an exemplary form of the present disclosure.
Figure 7:
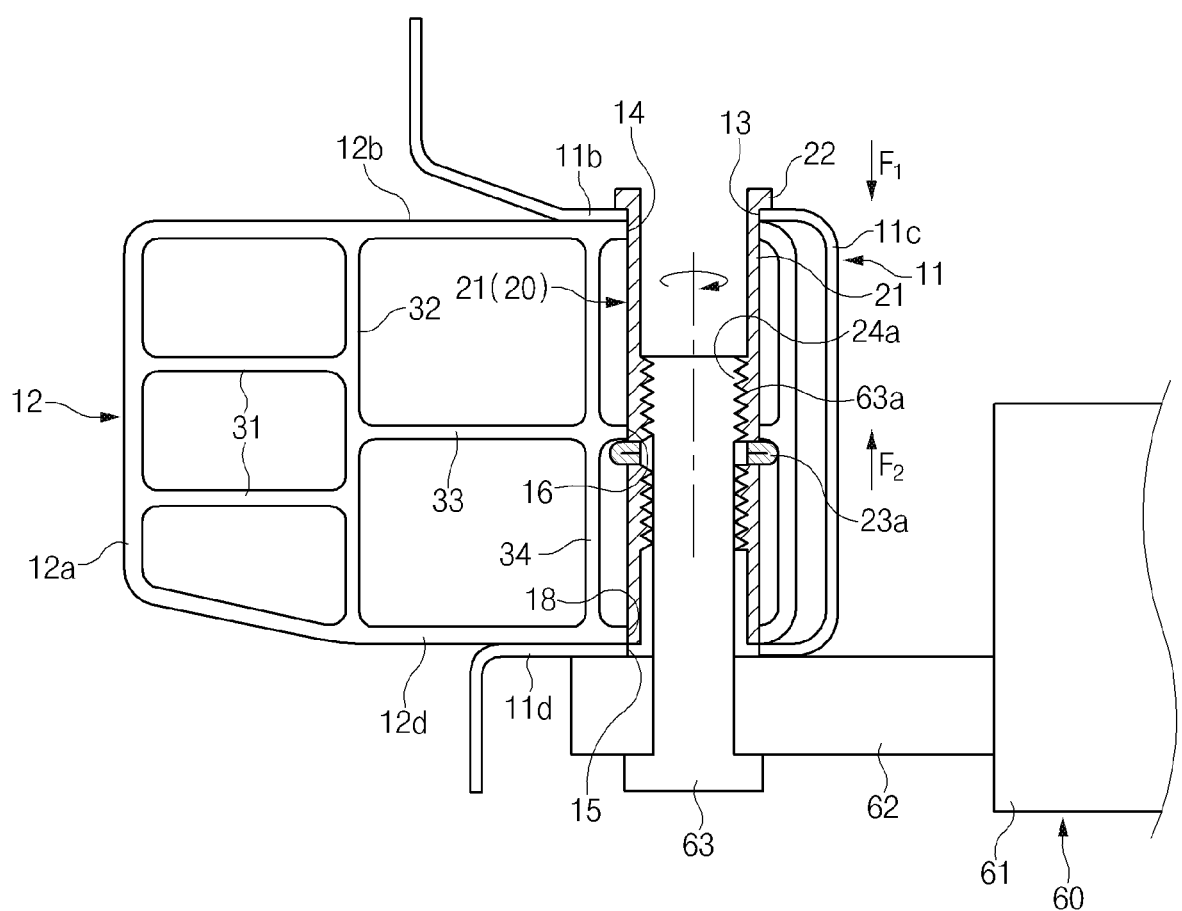
FIG. 7 illustrates a state in which a load is applied to a structure in which a battery assembly is mounted in a side sill structure for a vehicle according to an exemplary form of the present disclosure.

As illustrated in FIGS. 5 to 7, the battery mounting pipe 20 may be joined to the side sill reinforcement 12 and the side sill 11 by riveting, and thus the side sill reinforcement 12 may be firmly mounted in the cavity 11a of the side sill 11.

According to an exemplary form, for the riveting of the battery mounting pipe 20, the cylindrical portion 21 may include a deformable portion 23, an upper portion 24 located above the deformable portion 23, and a lower portion 25 located below the deformable portion 23.

The deformable portion 23 may be located in the middle of the cylindrical portion 21, and the deformable portion 23 may be deformable by an axial load which is applied in an axial direction of the battery mounting pipe 20.

As the deformable portion 23 has relatively low stiffness compared to the upper portion 24 and the lower portion 25, the upper portion 24 and the lower portion 25 may not be deformed by the axial load applied in the axial direction of the battery mounting pipe 20 while the deformable portion 23 may be deformed. In particular, the deformable portion 23 may be located below the support rib 33, and when the deformable portion 23 is deformed into a bulged portion 23a, the bulged portion 23a may press the support rib 33. Referring to FIG. 5, the bulged portion 23a may press the support rib 33 of the side sill reinforcement 12 upwardly, and the head portion 22 may press the top wall 11b of the side sill 11 downwardly, and thus the battery mounting pipe 20 may be riveted with respect to the side sill reinforcement 12 and the side sill 11.

According to an exemplary form, a thickness of the deformable portion 23 may be less than a thickness of the upper portion 24 and a thickness of the lower portion 25. As the axial load is applied in the axial direction of the cylindrical portion 21, the deformable portion 23 may easily be expanded or bulged outwards or be deformed outwards. Thus, as illustrated in FIG. 5, the deformable portion 23 may be deformed into the bulged portion 23a.

According to another exemplary form, the deformable portion 23 may have a plurality of recesses or a plurality of teeth extending longitudinally on an inner surface or outer surface thereof, and the plurality of recesses may be spaced apart from each other in a circumferential direction. As the axial load is applied to the cylindrical portion 21, the deformable portion 23 may be easily deformed outwards by the plurality of recesses or the plurality of teeth.

According to another exemplary form, the deformable portion 23 may be made of a soft material compared to the upper portion 24 and the lower portion 25. As the axial load is applied to the cylindrical portion 21, the deformable portion 23 may be easily deformed outwards by the plurality of recesses or the plurality of teeth.

The upper portion 24 may have an upper internal thread 24a formed on an inner surface thereof, and the lower portion 25 may have a lower internal thread 25a famed on an inner surface thereof. When an inner diameter of the upper internal thread 24a and an inner diameter of the lower internal thread 25a are less than an inner diameter of the deformable portion 23, the thickness of the deformable portion 23 may be less than the thickness of the upper portion 24 and the thickness of the lower portion 25.

A diameter of the head portion 22 may be greater than the diameter of the top mounting hole 13 of the side sill 11, and thus the head portion 22 may contact the top wall 11b of the side sill 11 adjacent to the top mounting hole 13.

Referring to FIG. 4, when the side sill reinforcement 12 is received in the cavity 11a of the side sill 11, the top mounting hole 14, the middle mounting hole 16, and the bottom mounting hole 18 of the side sill reinforcement 12 may be aligned with the top mounting hole 13 and the bottom mounting hole 15 of the side sill 11. The battery mounting pipe 20 may pass through the top mounting hole 13 and the bottom mounting hole 15 of the side sill 11 and the top mounting hole 14, the middle mounting hole 16, and the bottom mounting hole 18 of the side sill reinforcement 12. The head portion 22 of the battery mounting pipe 20 may contact the top wall 11b of the side sill 11 adjacent to the top mounting hole 13, and the deformable portion 23 may be located below the middle mounting hole 16.

Referring to FIG. 4, the drifter 51 of the nut riveter 50 may pass through the inside of the battery mounting pipe 20, and an external thread 52 of the drifter 51 may be screwed into the lower internal thread 25a of the lower portion 25. An anvil 53 of the nut riveter 50 may press or support the head portion 22 of the battery mounting pipe 20 downwardly, and thus the head portion 22 of the battery mounting pipe 20 may be held down by the anvil 53 of the nut riveter 50.

Referring to FIG. 5, when the drifter 51 moves upwardly by the operation of the nut riveter 50, the drifter 51 may pull the lower portion 25 of the battery mounting pipe 20 toward the anvil 53. As the lower portion 25 of the battery mounting pipe 20 is pulled toward the anvil 53 by the nut riveter 50, an axial load AF may be applied upwardly in the axial direction of the battery mounting pipe 20. As the deformable portion 23 located below the middle mounting hole 16 is expanded or bulged outwards by the axial load AF, the deformable portion 23 may be deformed into the bulged portion 23a. Upper and lower portions of the deformable portion 23 may overlap each other to form the bulged portion 23a, and an outer diameter of the bulged portion 23a may be greater than the diameter of the middle mounting hole 16.

Referring to FIGS. 6 and 7, the battery assembly 60 may include a battery case 61 in which a plurality of modules and electric/electronic components are received, and a side mount 62 protruding from a side surface of the battery case 61 toward the side sill 11. The mounting bolt 63 may pass through the side mount 62 and the battery mounting pipe 20, and an external thread 63a of the mounting bolt 63 may engage with the upper internal thread 24a of the battery mounting pipe 20.

As the external thread 63a of the mounting bolt 63 engages with the upper internal thread 24a of the battery mounting pipe 20, and the head portion 22 of the battery mounting pipe 20 presses the top wall 11b of the side sill 11, a first load F1 may be applied downwardly in the axial direction of the battery mounting pipe 20. As the bulged portion 23a of the battery mounting pipe 20 presses the support rib 33 of the side sill reinforcement 12 upwardly, a second load F2 may be applied upwardly in the axial direction of the battery mounting pipe 20. Thus, a mounting load of the battery assembly 60 may be uniformly distributed, and the mount stiffness and/or mount strength of the battery assembly 60 may be increased.

According to the exemplary form of FIGS. 1 to 7, the battery mounting pipe 20 may pass through the side sill 11 and the side sill reinforcement 12, the head portion 22 of the battery mounting pipe 20 may press the top wall 11b of the side sill 11 downwardly, and the bulged portion 23a of the battery mounting pipe 20 may press the support rib 33 of the side sill reinforcement 12 upwardly. In this configuration, the battery mounting pipe 20 may firmly join the side sill 11 and the side sill reinforcement 12.

FIGS. 8 to 11 illustrate a side sill structure 100 for a vehicle according to another exemplary form of the present disclosure. Referring to FIGS. 8 to 11, the side sill structure 100 for a vehicle according to another exemplary form of the present disclosure may include a side sill 110, a side sill reinforcement 120 received in the side sill 110, and a battery mounting pipe 200 joining the side sill 110 and the side sill reinforcement 120.

The side sill 110 may include a cavity 111 open to the exterior of the vehicle, a top wall 112 facing the top of the vehicle, an inboard side wall 113 facing the interior of the vehicle, and a bottom wall 114 facing the ground. The cavity 111 may be defined by the top wall 112, the inboard side wall 113, and the bottom wall 114. For example, the side sill 11 may be a metal material having high strength, such as steel.

Figure 11:
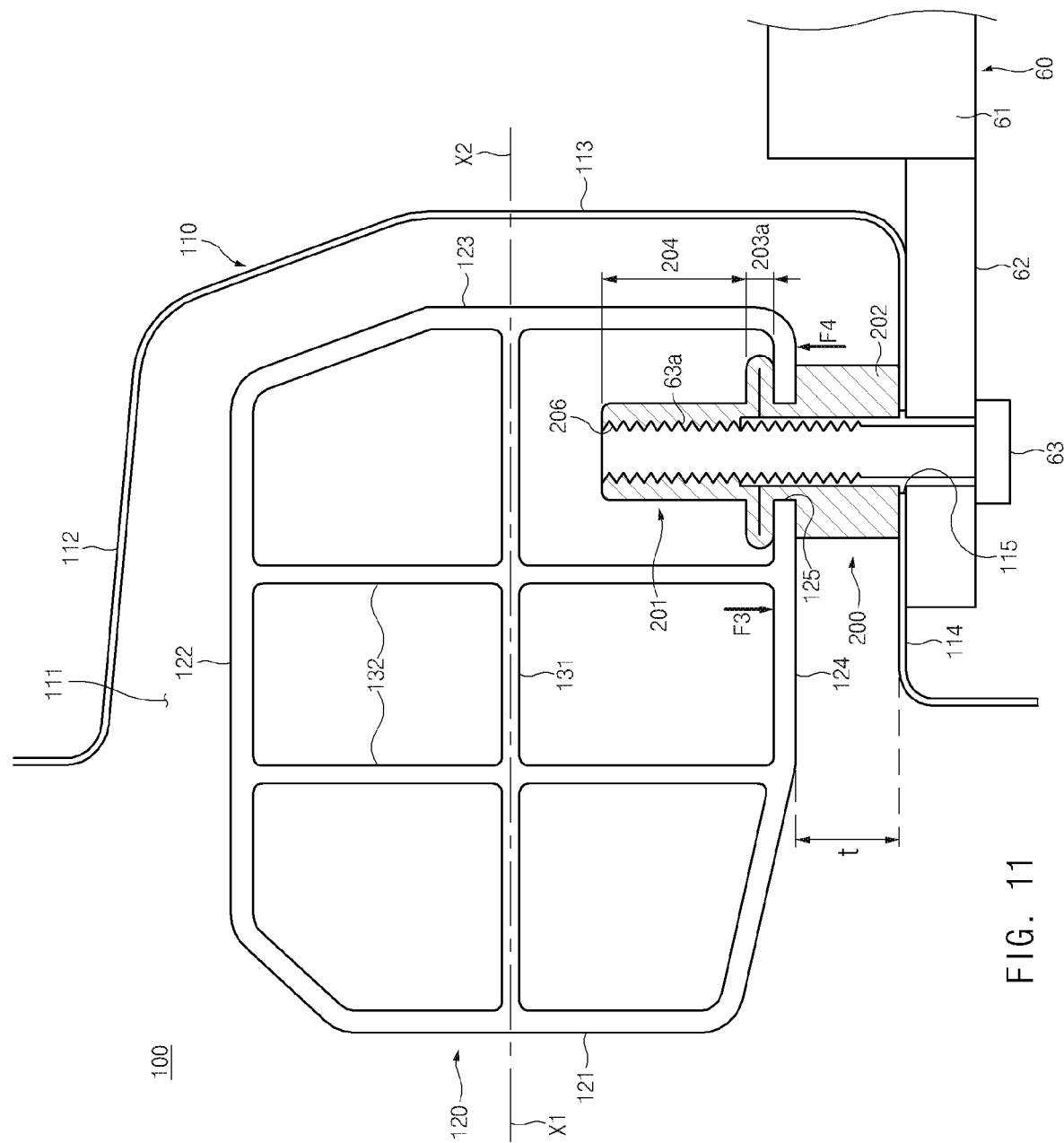
FIG. 11 illustrates a cross-sectional view of a structure in which a battery assembly is mounted in a side sill structure for a vehicle according to another exemplary form of the present disclosure.

The side sill reinforcement 120 may be an extruded product which is produced by an extrusion method in the longitudinal direction of the vehicle. Referring to FIG. 11, the side sill reinforcement 120 may include an outboard side wall 121 facing the exterior of the vehicle, a top wall 122 facing the top of the vehicle, an inboard side wall 123 facing the interior of the vehicle, and a bottom wall 124 facing the ground. For example, the side sill reinforcement 120 may be a material having excellent toughness and stiffness, such as aluminum and an aluminum alloy.

When the side sill reinforcement 120 is received in the cavity 111 of the side sill 110, the top wall 122 of the side sill reinforcement 120 may face the top wall 112 of the side sill 110, the inboard side wall 123 of the side sill reinforcement 120 may face the inboard side wall 113 of the side sill 110, and the bottom wall 124 of the side sill reinforcement 120 may face the bottom wall 114 of the side sill 110. The side sill reinforcement 120 may extend in a longitudinal direction of the side sill 110. The side sill reinforcement 120 may have a plurality of ribs 131 and 132 formed therein, and the plurality of ribs 131 and 132 may extend in a longitudinal direction of the side sill reinforcement 120. The stiffness of the side sill reinforcement 120 may be improved by the plurality of ribs 131 and 132, and thus an impact load during a side impact of the vehicle may be uniformly distributed through the plurality of ribs 131 and 132.

The side sill reinforcement 120 may have a horizontal rib 131 and a plurality of vertical ribs 132 connected to the horizontal rib 131. The horizontal rib 131 may extend horizontally to connect the outboard side wall 121 and the inboard side wall 123. The vertical rib 132 may extend vertically to connect the top wall 122 and the bottom wall 124.

The side sill reinforcement 120 may have a first mounting hole 125 through which a cylindrical portion 201 of the battery mounting pipe 200 passes. Specifically, the first mounting hole 125 may be formed in the bottom wall 124 of the side sill reinforcement 120.

The side sill 110 may have a second mounting hole 115 through which the mounting bolt 63 passes. Specifically, the second mounting hole 115 may be formed in the bottom wall 114 of the side sill 110. The second mounting hole 115 may be aligned with the first mounting hole 125 and the battery mounting pipe 200.

Figure 8:
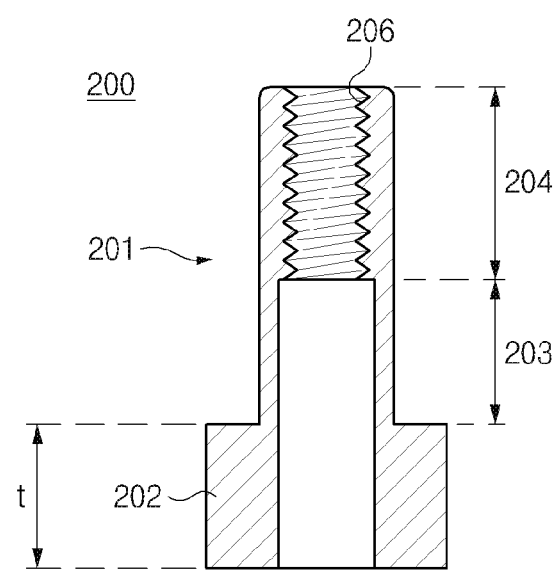
FIG. 8 illustrates a cross-sectional view of a battery mounting pipe in a side sill structure for a vehicle according to another exemplary form of the present disclosure.

The battery mounting pipe 200 may be a hollow pipe in which the drifter 51 of the nut riveter 50, the mounting bolt 63, and the like are received. Referring to FIG. 8, the battery mounting pipe 200 may include the cylindrical portion 201 and a head portion 202 provided on a bottom end of the cylindrical portion 201.

Figure 9:
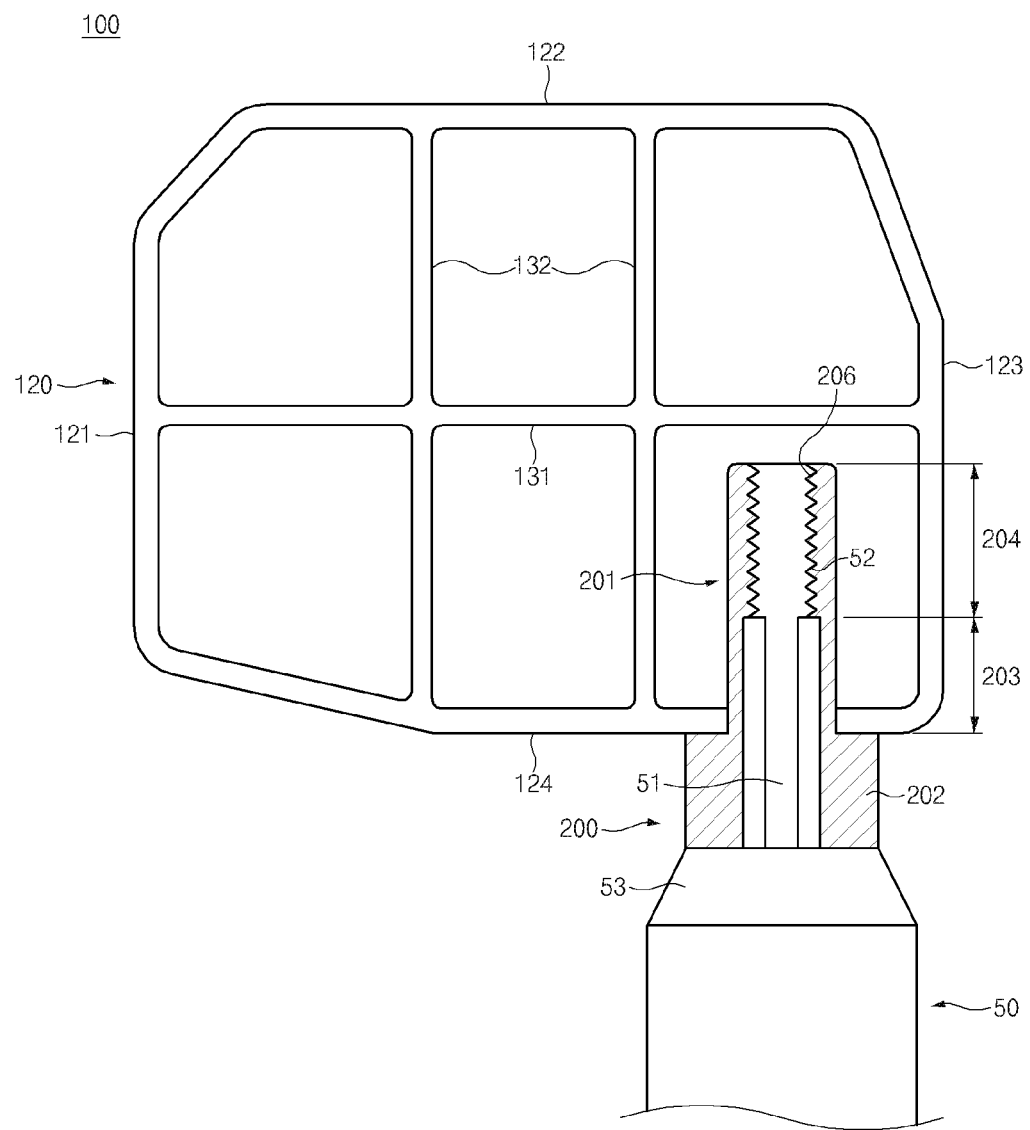
FIG. 9 illustrates a state in which a drifter and an anvil of a nut riveter are set up in a battery mounting pipe in a side sill structure for a vehicle according to another exemplary form of the present disclosure.
Figure 10:
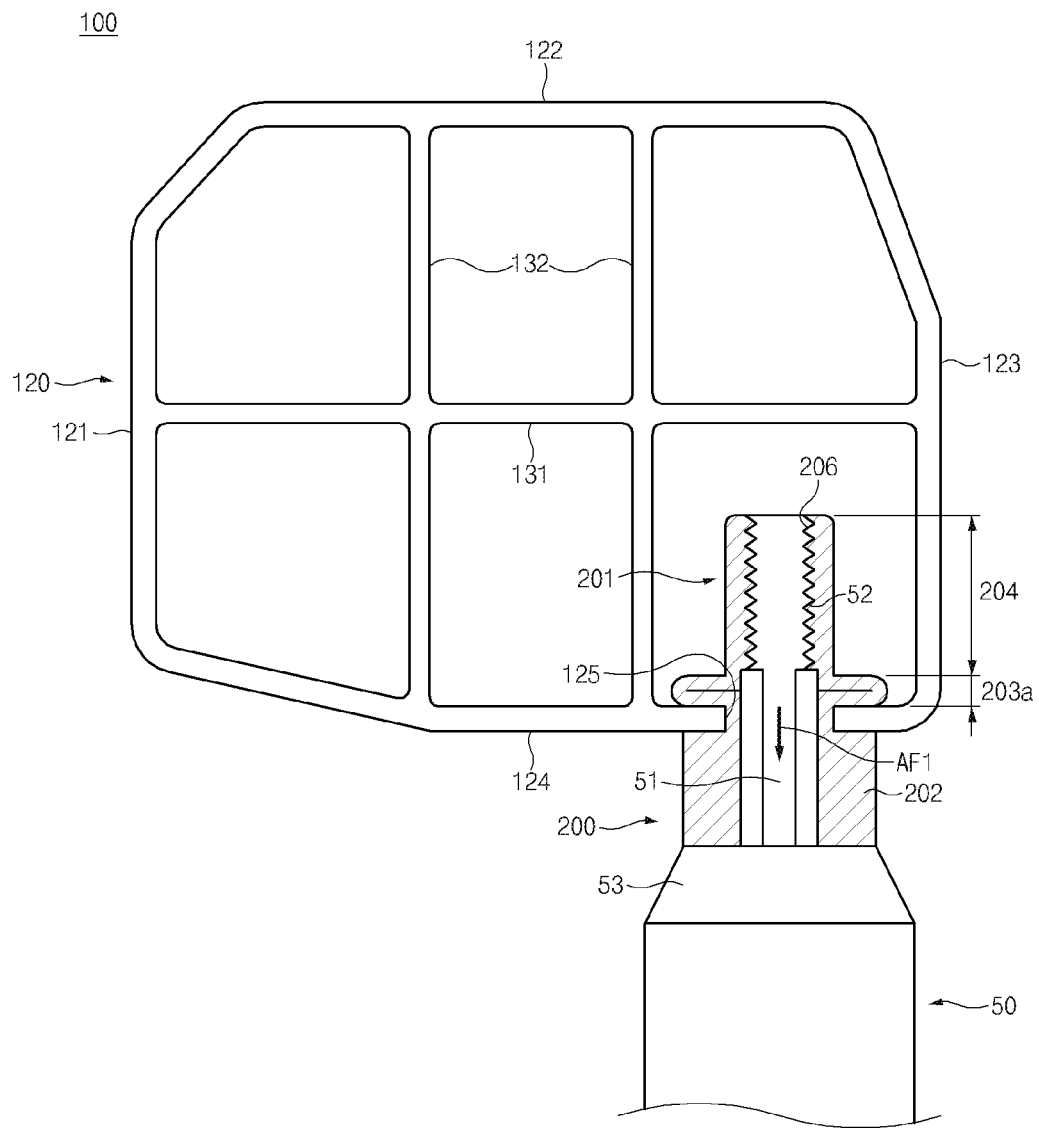
FIG. 10 illustrates a state in which a deformable portion of the battery mounting pipe is deformed as the drifter of the nut riveter operates.

Referring to FIGS. 9 to 11, the battery mounting pipe 200 may be riveted to the side sill reinforcement 120 and the mounting bolt 63 for mounting the battery case 61 may be fastened to the battery mounting pipe 200, and thus the side sill reinforcement 120 may be firmly joined to the side sill 110.

According to an exemplary form, for the riveting of the battery mounting pipe 200, the cylindrical portion 201 may include a deformable portion 203 and an upper portion 204 located above the deformable portion 203. That is, the deformable portion 203 may be located between the upper portion 204 and the head portion 202.

The deformable portion 203 may be located above the head portion 202, and the deformable portion 203 may be deformable by an axial load which is applied in an axial direction of the battery mounting pipe 200.

As the deformable portion 203 has relatively low stiffness compared to the upper portion 204, the upper portion 204 may not be deformed by the axial load applied in the axial direction of the battery mounting pipe 200 while the deformable portion 203 may be deformed. In particular, when the deformable portion 203 is deformed into a bulged portion 203a, the bulged portion 203a may press the bottom wall 124 of the side sill reinforcement 120. Referring to FIG. 11, the bulged portion 203a may press the bottom wall 124 of the side sill reinforcement 120 downwardly, and the head portion 202 may press the bottom wall 124 of the side sill reinforcement 120 upwardly, and thus the battery mounting pipe 200 may be riveted with respect to the side sill reinforcement 120 and the side sill 110.

According to an exemplary form, a thickness of the deformable portion 203 may be less than a thickness of the upper portion 204. As the axial load is applied in the axial direction of the cylindrical portion 201, the deformable portion 203 may easily be expanded or bulged outwards or be deformed outwards. Thus, as illustrated in FIG. 11, the deformable portion 203 may be deformed into the bulged portion 203a.

According to another exemplary form, the deformable portion 203 may have a plurality of recesses or a plurality of teeth extending longitudinally on an inner surface or outer surface thereof, and the plurality of recesses may be spaced apart from each other in a circumferential direction. As the axial load is applied to the cylindrical portion 201, the deformable portion 203 may be easily deformed outwards by the plurality of recesses or the plurality of teeth.

According to another exemplary form, the deformable portion 203 may be made of a soft material compared to the upper portion 204. As the axial load is applied to the cylindrical portion 201, the deformable portion 203 may be easily deformed outwards by the plurality of recesses or the plurality of teeth.

The upper portion 204 may have an internal thread 206 formed on an inner surface thereof. When an inner diameter of the internal thread 206 is less than an inner diameter of the deformable portion 203, the thickness of the deformable portion 203 may be less than the thickness of the upper portion 204.

A diameter of the head portion 202 may be greater than a diameter of the first mounting hole 125, and thus the head portion 202 may contact the bottom wall 124 of the side sill reinforcement 120 adjacent to the first mounting hole 125.

As the cylindrical portion 201, that is, the upper portion 204 and the deformable portion 203 of the battery mounting pipe 200 pass through the first mounting hole 125 of the side sill reinforcement 120, the head portion 202 of the battery mounting pipe 200 may contact the bottom wall 124 of the side sill reinforcement 120 adjacent to the first mounting hole 125. As the head portion 202 of the battery mounting pipe 200 is interposed between the bottom wall 124 of the side sill reinforcement 120 and the bottom wall 114 of the side sill 110, and the head portion 202 of the battery mounting pipe 200 supports the side sill reinforcement 120, the position (horizontal position and/or vertical position) of the side sill reinforcement 120 may be evenly arranged within the cavity 111 of the side sill 110. That is, the side sill reinforcement 120 may be evenly arranged in the horizontal and/or vertical center of the cavity 111 of the side sill 110. A thickness t of the head portion 202 may be determined so that the side sill reinforcement 120 may be evenly arranged in the horizontal and/or vertical center position of the cavity 111 of the side sill 110.

Referring to FIG. 11, the thickness t of the head portion 202 may be determined so that a horizontal center axis X1 of the side sill reinforcement 120 may be aligned with a horizontal center axis X2 of the side sill 110. Thus, the side sill reinforcement 120 may be symmetrically or evenly positioned with respect to the horizontal center axis X2 of the side sill 110 in the cavity 111 of the side sill 110, the top wall 122 of the side sill reinforcement 120 may be spaced apart from the top wall 112 of the side sill 110, and the bottom wall 124 of the side sill reinforcement 120 may be spaced apart from the bottom wall 114 of the side sill 110.

Since the side sill reinforcement 120 is arranged in the cavity 111 of the side sill 110 by the head portion 202 of the battery mounting pipe 200, a size of the side sill reinforcement 120 may be reduced compared to a size of the side sill 110. Thus, the manufacturing cost and weight of the side sill reinforcement 120 may be reduced, and the side sill reinforcement 120 may secure impact performance with respect to the side sill 110.

Referring to FIG. 9, when the cylindrical portion 201 of the battery mounting pipe 200 is received in the side sill reinforcement 120 through the first mounting hole 125, the head portion 202 of the battery mounting pipe 200 may contact the bottom wall 124 of the side sill reinforcement 120 adjacent to the first mounting hole 125, and the deformable portion 203 may be located lower than the first mounting hole 125 of the side sill reinforcement 120. The drifter 51 of the nut riveter 50 may pass through the inside of the battery mounting pipe 20, and the external thread 52 of the drifter 51 may be screwed into the internal thread 206 of the upper portion 204. The anvil 53 of the nut riveter 50 may press or support the head portion 202 of the battery mounting pipe 200 upwardly, and thus the head portion 202 of the battery mounting pipe 200 may be held down by the anvil 53 of the nut riveter 50.

Referring to FIG. 10, when the drifter 51 moves downwardly by the operation of the nut riveter 50, the drifter 51 may pull the upper portion 204 of the battery mounting pipe 200 toward the anvil 53. As the upper portion 204 of the battery mounting pipe 200 is pulled toward the anvil 53 by the nut riveter 50, an axial load AF1 may be applied downwardly in the axial direction of the battery mounting pipe 200. As the deformable portion 203 located above the first mounting hole 125 is expanded or bulged outwards by the axial load AF1, the deformable portion 203 may be deformed into the bulged portion 203a, and the battery mounting pipe 200 may be joined to the first mounting hole 125 of the side sill reinforcement 120 by the bulged portion 203a. Upper and lower portions of the deformable portion 203 may overlap each other to form the bulged portion 203a, and an outer diameter of the bulged portion 203a may be greater than the diameter of the first mounting hole 125. After the battery mounting pipe 200 is joined to the side sill reinforcement 120, the nut riveter 50 may be separated from the battery mounting pipe 200.

Referring to FIG. 11, when the side sill reinforcement 120 is received in the cavity 111 of the side sill 110, the battery mounting pipe 200 and the first mounting hole 125 of the side sill reinforcement 120 may be aligned with the second mounting hole 115 of the side sill 110. The mounting bolt 63 may pass through the second mounting hole 115 of the side sill 110, the side mount 62 of the battery case 61, and the battery mounting pipe 200, and the external thread 63a of the mounting bolt 63 may engage with the internal thread 206 of the battery mounting pipe 200. As the external thread 63a of the mounting bolt 63 engages with the internal thread 206 of the battery mounting pipe 200, the bulged portion 203a of the battery mounting pipe 200 may press the bottom wall 124 of the side sill reinforcement 120 downwardly, and a third load F3 may be applied downwardly in the axial direction of the battery mounting pipe 200. As the head portion 202 of the battery mounting pipe 200 presses the bottom wall 124 of the side sill reinforcement 120 upwardly, a fourth load F4 may be applied upwardly in the axial direction of the battery mounting pipe 200. Thus, a mounting load of the battery assembly 60 may be uniformly distributed, and the mount stiffness and/or mount strength of the battery assembly 60 may be increased.

According to the exemplary form of FIGS. 8 to 11, the battery mounting pipe 200 may not pass through the side sill 110, the battery mounting pipe 200 may pass through the bottom wall 124 of the side sill reinforcement 120, the head portion 202 of the battery mounting pipe 200 may press the bottom wall 124 of the side sill reinforcement 120 upwardly, and the bulged portion 203a of the battery mounting pipe 200 may press the bottom wall 124 of the side sill reinforcement 120 downwardly. That is, the battery mounting pipe 200 may be firmly joined to the side sill reinforcement 120 by riveting.

As set forth above, according to exemplary forms of the present disclosure, as the battery mounting pipe 20 or 200 is riveted to the side sill reinforcement 12 or 120, and the mounting bolt 63 is fastened to the battery mounting pipe 20 or 200, the side sill reinforcement 12 or 120 may be firmly mounted in the side sill 11 or 110 without using brackets and welding, and thus the weight and manufacturing cost may be reduced.

In addition, according to exemplary forms of the present disclosure, when the battery assembly 60 is mounted with the battery mounting pipe 20 or 200 through the mounting bolt 63, the battery mounting pipe 20 or 200 may uniformly distribute the mounting load of the battery assembly 60, and thus the mount stiffness and mount strength of the battery assembly 60 may be increased.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A side sill structure for a vehicle, the side sill structure comprising:
    a side sill having a cavity;
    a side sill reinforcement which is received in the cavity of the side sill; and
    a battery mounting pipe which is joined to the side sill reinforcement,
    wherein the side sill reinforcement is joined to the side sill as a mounting bolt is fastened to the battery mounting pipe, and
    wherein:
        the battery mounting pipe includes a head portion, and a bulged portion located below the head portion,
        the side sill reinforcement has a support rib configured to support the bulged portion,
        the bulged portion is configured to press the support rib upwardly, and
        the head portion is configured to press a top wall of the side sill downwardly.

2. The side sill structure according to claim 1, wherein the side sill reinforcement has a first mounting hole through which the battery mounting pipe passes.

3. A side sill structure for a vehicle, the side sill structure comprising:
    a side sill having a cavity;
    a side sill reinforcement which is received in the cavity of the side sill; and
    a battery mounting pipe which is joined to the side sill reinforcement,
    wherein the side sill reinforcement is joined to the side sill as a mounting bolt is fastened to the battery mounting pipe, and
    wherein:
        the battery mounting pipe includes a head portion, a bulged portion located above the head portion, and an upper portion located above the bulged portion,
        a top surface of the head portion contacts a bottom wall of the side sill reinforcement,
        a bottom surface of the head portion contacts a bottom wall of the side sill, and
        a thickness of the head portion is configured to determined so that a horizontal center axis of the side sill reinforcement is aligned with a horizontal center axis of the side sill.

4. The side sill structure according to claim 3, wherein:
    the head portion has an outer diameter greater than a diameter of a first mounting hole through which the battery mounting pipe passes, and
    the head portion is configured to support the side sill reinforcement.

5. The side sill structure according to claim 3, wherein:
    a first mounting hole through which the battery mounting pipe passes is provided in the bottom wall of the side sill reinforcement,
    the bulged portion is configured to press the bottom wall of the side sill reinforcement downwardly, and
    the head portion is configured to press the bottom wall of the side sill reinforcement upwardly.

6. The side sill structure according to claim 3, wherein:
    the side sill structure has a first mounting hole and a second mounting hole which is aligned with the first mounting hole and the battery mounting pipe,
    the mounting bolt is configured to pass through the first mounting hole and a hollow portion of the battery mounting pipe, and
    an external thread of the mounting bolt is configured to engage with an internal thread of the upper portion.

7. The side sill structure according to claim 1, wherein:
    the side sill reinforcement has a plurality of first mounting holes through which the battery mounting pipe passes,
    the side sill has a plurality of second mounting holes through which the battery mounting pipe passes, and
    second mounting holes of the plurality of second mounting holes are aligned with first mounting holes of the plurality of first mounting holes.

8. The side sill structure according to claim 1, wherein:
    the battery mounting pipe includes a cylindrical portion,
    the cylindrical portion includes a deformable portion, an upper portion located above the deformable portion, and a lower portion located below the deformable portion.

9. The side sill structure according to claim 8, wherein a thickness of the deformable portion is less than a thickness of the upper portion and a thickness of the lower portion.

10. The side sill structure according to claim 8, wherein the upper portion is provided with an internal thread formed on an inner surface thereof.

11. The side sill structure according to claim 8, wherein the lower portion is provided with an internal thread formed on an inner surface thereof.

* * * * *